(12) United States Patent
Lopez et al.

(10) Patent No.: US 11,996,909 B2
(45) Date of Patent: May 28, 2024

(54) APPARATUS, METHODS AND MACHINE-READABLE MEDIA RELATING TO PHASE TRACKING IN A WIRELESS NETWORK

(71) Applicant: Telefonaktiebolaget LM Ericsson (publ), Stockholm (SE)

(72) Inventors: Miguel Lopez, Solna (SE); Leif Wilhelmsson, Lund (SE); Dennis Sundman, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 448 days.

(21) Appl. No.: 17/609,502

(22) PCT Filed: May 9, 2019

(86) PCT No.: PCT/EP2019/061986
§ 371 (c)(1),
(2) Date: Nov. 8, 2021

(87) PCT Pub. No.: WO2020/224790
PCT Pub. Date: Nov. 12, 2020

(65) Prior Publication Data
US 2022/0231731 A1    Jul. 21, 2022

(51) Int. Cl.
H04B 7/024      (2017.01)
H04L 27/26      (2006.01)
H04W 84/12      (2009.01)

(52) U.S. Cl.
CPC ......... *H04B 7/024* (2013.01); *H04L 27/2657* (2013.01); *H04W 84/12* (2013.01)

(58) Field of Classification Search
CPC ..... H04B 7/024; H04B 7/026; H04L 27/2657; H04W 84/12
See application file for complete search history.

(56) References Cited

U.S. PATENT DOCUMENTS

| 2018/0191546 A1 | 7/2018 | Azizi et al. |
| 2018/0205434 A1 | 7/2018 | Cherian et al. |

(Continued)

FOREIGN PATENT DOCUMENTS

| RU | 2546148 C2 | 4/2015 |
| WO | 2014200876 A1 | 12/2014 |
| WO | 2017052871 A1 | 3/2017 |

OTHER PUBLICATIONS

IEEE, "Part 11: Wireless LAN Medium Access Control (MAC) and Physical Layer (PHY) Specifications", IEEE Std 802.11™-2016 (Revision of IEEE Std 802.11-2012), IEEE Standard for Information technology—Telecommunications and information exchange between systems Local and metropolitan area networks—Specific requirements, IEEE Computer Society, Dec. 7, 2016, 1-3534.

(Continued)

*Primary Examiner* — Kent Krueger

(57) ABSTRACT

A method is performed by a network node of a communication network. The communication network comprises a plurality of coordinated radio access network nodes for transmitting multiple streams of data to a wireless device in a given time resource. The method comprises: causing transmission, to the wireless device, of an indication that the wireless device should perform multiple separate phase-tracking processes on the signals received from the plurality of coordinated radio access network nodes in the given time resource.

26 Claims, 10 Drawing Sheets

(56) References Cited

U.S. PATENT DOCUMENTS

2018/0368013 A1\* 12/2018 Yoo ................ H04L 5/0048
2019/0052433 A1\* 2/2019 Yoo ................ H04L 5/0082
2019/0132762 A1 5/2019 Zhu et al.

OTHER PUBLICATIONS

Kai, Shi, et al., "Phase Tracking During VHT-LTF", IEEE 802.11-10/0771r0, Submission, Jul. 2010, 1-19.
Rahul, Hariharan, et al., "SourceSync: A Distributed Wireless Architecture for Exploiting Sender Diversity", Computer Communication Review, vol. 41, No. 4, ACM, New York, NY, Aug. 30, 2010, 171-182.
"Enhancements on multi-TRP/Panel transmission", 3GPP TSG RAN WG1 #96, R1-1901634, ZTE, Athens, Greece, Feb. 25-Mar. 1, 2019, 19 pages.

\* cited by examiner

APPARATUS, METHODS AND MACHINE-READABLE MEDIA RELATING TO PHASE TRACKING IN A WIRELESS NETWORK

TECHNICAL FIELD

Embodiments of the disclosure provide apparatus, methods and machine-readable media relating to phase tracking in a wireless network, and particularly relate to phase tracking of signals receives more a plurality of coordinated radio access network nodes.

BACKGROUND

The IEEE 802.11-16 standard (Wireless LAN Medium (MAC and Physical Layer (PHY) Specifications) specifies a set of orthogonal matrices, often called P matrices, which are employed as orthogonal cover codes for channel estimation when utilizing more than one space time stream, i.e., multiple-input-multiple-output (MIMO) system operation. These P matrices are applied to the Long Training Field (LTF), which comprises one or more sequences of values known by the receiver and used for channel estimation.

In 802.11n the orthogonal cover code is applied to all subcarriers. In contrast, in 802.11ac/ax, it is not applied to the pilot subcarriers. The purpose of the pilot subcarriers is to aid in phase tracking, which is used to mitigate performance degradation due to phase noise and Carrier Frequency Offset (CFO). CFO is due to the relative drift of the TX and RX clocks in the transmitter and the receiver.

In 802.11ac/ax the pilot subcarriers are transmitted in single-input-single-output (SISO) mode even when MIMO is employed, i.e., the same frequency domain symbol is transmitted in all space time streams when the subcarrier is a pilot subcarrier. This allows receivers supporting 802.11ac/ax to perform phase tracking over the LTF, even before the channel has been estimated. This is beneficial since residual CFO can lead to degraded channel estimates.

Recently, Extremely High Throughput (EHT) has been proposed as an enhancement of the IEEE 802.11 standard. In particular, it has been proposed to allow distributed downlink MIMO (D-DL-MIMO), where two or more coordinated access points (APs) transmit several space time streams simultaneously to the same receiving station (STA).

This type of transmission is typically transparent to the receiver STA. In other words, the STA is typically not aware that the transmission that it is receiving originates from multiple APs. From the point of view of the STA, the signal is subject to multi-path propagation.

A problem that did not occur in 802.11n/ac/ax but may do in EHT is that when D-DL-MIMO is used, the clocks of the transmitting APs will not be synchronized, i.e., the clocks of the transmitting APs and the receiving STA will all drift independently during transmission of a data frame. This drift happens independently of whether the clocks were previously synchronized (e.g. with the help of a trigger frame). The phase tracking methodology used in 802.11ac/ax implicitly assumes that there is only one clock on the TX side and one clock on the RX side and that any CFO is due to the relative clock drift between the two clocks. However, in EHT this may no longer be the case as there are three or more unsynchronized clocks.

A solution to this problem is therefore required.

SUMMARY

According to a first aspect of the disclosure, there is provided a method performed by a network node of a communication network. The communication network comprises a plurality of coordinated radio access network nodes for transmitting multiple streams of data to a wireless device in a given time resource. The method comprises: causing transmission, to the wireless device, of an indication that the wireless device should perform multiple separate phase-tracking processes on the signals received from the plurality of coordinated radio access network nodes in the given time resource.

Apparatus and machine-readable media are also provided for performing the method set out above. For example, in one embodiment, a network node is provided for a communication network. The communication network comprises a plurality of coordinated radio access network nodes for transmitting multiple streams of data to a wireless device in a given time resource. The network node comprises processing circuitry and a non-transitory machine-readable medium storing instructions which, when executed by the processing circuitry, cause the network node to: cause transmission, to the wireless device, of an indication that the wireless device should perform multiple separate phase-tracking processes on the signals received from the plurality of coordinated radio access network nodes in the given time resource.

In a second aspect of the disclosure, there is provided a method performed by a wireless device for receiving data from a plurality of coordinated radio access network nodes. The plurality of coordinated radio access network nodes transmit multiple streams of data to the wireless device in a given time resource. The method comprises: receiving, from a network node, an indication that the wireless device should perform multiple separate phase-tracking processes on the signals received from the plurality of coordinated radio access network nodes in the given time resource.

Apparatus and machine-readable media are also provided for performing the method set out above. For example, in one embodiment, a wireless device is provided for receiving data from a plurality of coordinated radio access network nodes. The plurality of coordinated radio access network nodes transmit multiple streams of data to the wireless device in a given time resource. The wireless device comprises processing circuitry and a non-transitory machine-readable medium storing instructions which, when executed by the processing circuitry, cause the wireless device to: receive, from a network node, an indication that the wireless device should perform multiple separate phase-tracking processes on the signals received from the plurality of coordinated radio access network nodes in the given time resource.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
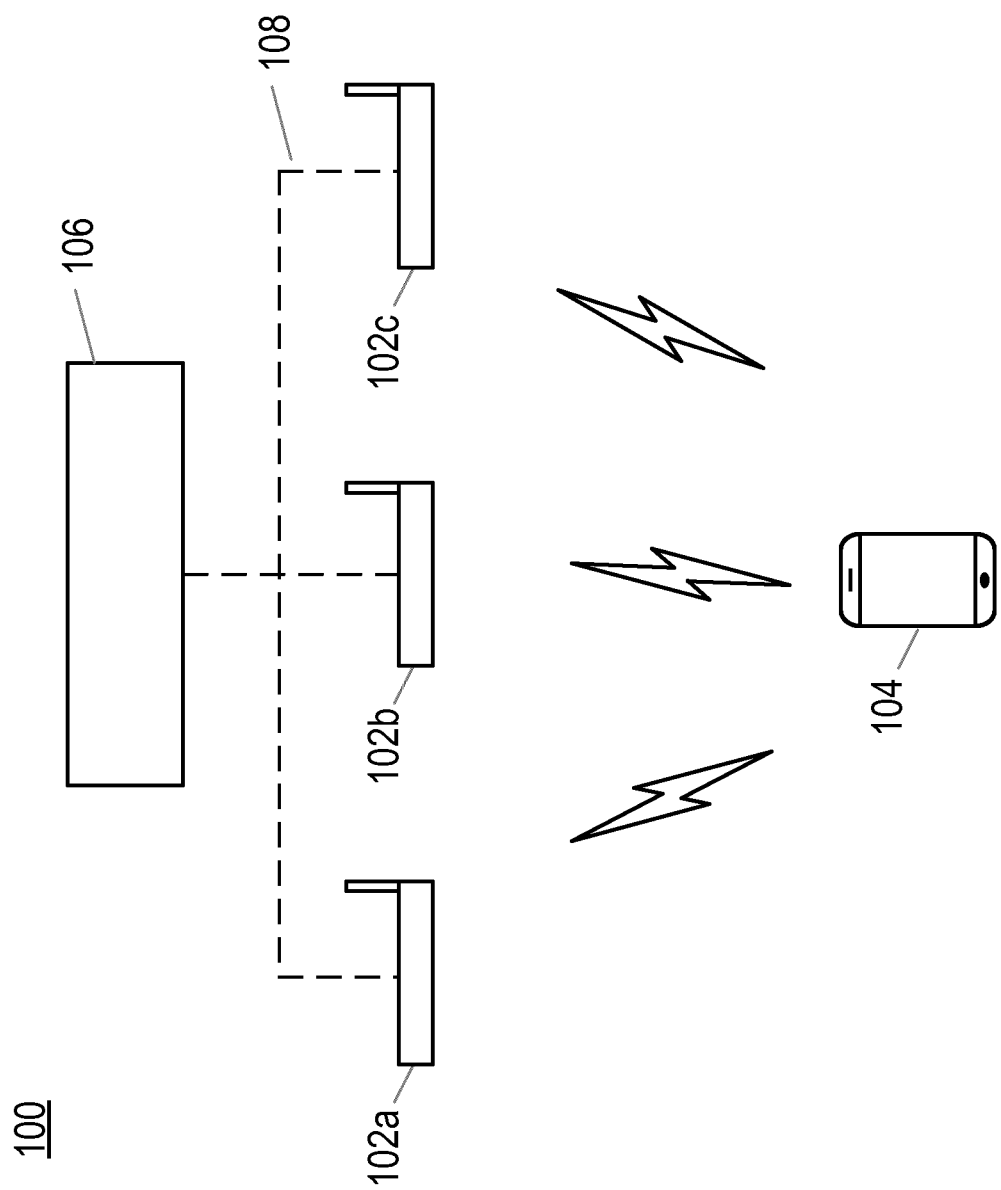
FIG. 1 shows a system according to embodiments of the disclosure.

FIG. 1 shows a wireless communication network or system 100 according to embodiments of the disclosure. The network 100 comprises a plurality of wireless access points 102a, 102b, 102c (collectively, 102) in communication with a mobile station 104. In one embodiment, the network 100 implements the IEEE 802.11 standard (known as "Wi-Fi") and may implement one or more of its amendments, and comprises a wireless local area network (WLAN). For convenience, the terminology used herein may correspond to that used in the 802.11 standard (e.g., "access point" or AP, "station" or STA). However, the concepts described herein may also find use in other radio-access technologies. For example, the network 100 may implement cellular radio-access technologies, such as those developed by the $3^{rd}$ Generation Partnership Project (3GPP), e.g., Wideband Code-Division Multiple-Access (WCDMA), Long Term Evolution (LTE), New Radio (NR), etc. In such cases, the wireless access points 102 may be called base stations, NodeBs, eNodeBs, gNodeBs, transmission-reception points (TRP), etc. The mobile station 104 may be called a user equipment (UE), a wireless device, a wireless terminal device, etc. The term "node" is used herein to mean any wireless device and any suitable network node.

Each wireless access point 102 comprises one or, in some embodiments, multiple antennas (or antenna elements). Similarly, the wireless device 104 may also comprise multiple antennas. In this way, the wireless device 104 is able to use processing techniques to receive and decode multiple space time streams from the multiple access points simultaneously.

The plurality of wireless access points 102 are connected to each other via a backhaul network 108, which may be wired or wireless. For example, the backhaul network 108 may be implemented using the Internet, and/or a dedicated network which may be wired or wireless.

In the illustrated embodiment, the system 100 further comprises a processing node 106 which is coupled to each of the wireless access points 102 via the backhaul network 108. For example, the processing node 106 may be provided within a remote processing environment, such as a cloud server. In this embodiment, the specified functions of the wireless access points 102 are distributed between the wireless access points 102 and the processing node 106. Thus, one or more of the functions of the wireless access points 102 may be performed in a remote processing environment, e.g., by the processing node 106. Further detail regarding this aspect will be provided below.

As noted above, it has been proposed to provide distributed downlink MIMO (D-DL-MIMO), where two or more coordinated access points APs transmit multiple space time streams simultaneously to the same receiving station STA, i.e., using the same time resources.

Figure 2:
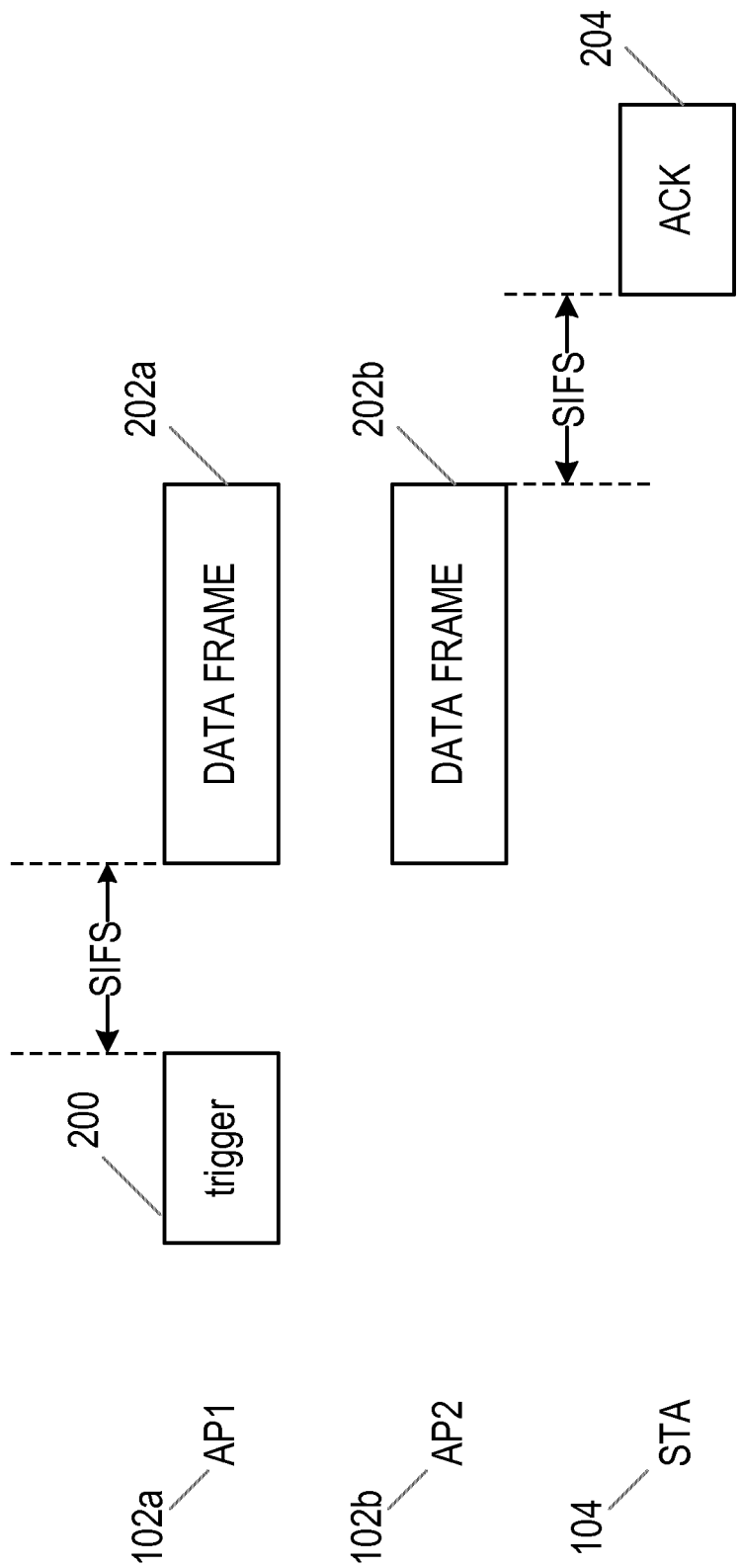
FIG. 2 is a signalling diagram of co-ordinated downlink transmissions according to embodiments of the disclosure.

According to one approach to such distributed downlink MIMO, one of the multiple access points (e.g., wireless access point 102a) is designated as a master access point and one or more others (e.g., access point 102b) are designated as slave access points. FIG. 2 is a signalling diagram of co-ordinated downlink transmissions according to such embodiments, in which the transmissions of only a single master access point (AP1) and a single slave access point (AP2), as well as the wireless device, are shown.

The signalling begins with the master access point 102a transmitting an initial trigger message 200. The trigger message 200 is received by the slave access point 102b, and used to control the timing of subsequent transmissions of data frames 202a and 202b by the master access point 102a and the slave access point 102b, respectively.

Specifically, the data frames 202a, 202b are transmitted simultaneously a certain timing offset after transmission of the trigger message 200. In the illustrated embodiment, this timing offset is defined as the short inter-frame space (SIFS). However, alternative timing offsets may be used. The data frames 202a, 202b may be substantial duplicates of each other (e.g., comprising the same data), or may comprise different data.

After a further SIFS, the wireless device 104 acknowledges receipt of the data frames 202a, 202b through the transmission of an ACK message 204.

Those skilled in the art will appreciate that the signalling shown in FIG. 2 is just one possible embodiment for the co-ordination of simultaneous transmissions by distributed wireless access point. Alternative embodiments are possible, of course, without departing from the scope of the claims appended hereto. For example, the access points 102 may be synchronized with each other over a long period, and then controlled to transmit data frames to the wireless device 104 through a long-term scheduling co-ordinated via the backhaul network 108. The present disclosure is not limited in that respect.

Returning to the system 100 shown in FIG. 1, we first illustrate an embodiment of the disclosure by means of a simple yet relevant example. Consider the case where there are two access points each having a rank one channel to the STA (e.g., the wireless access points 102a and 102b). This means that the channel between the wireless access point 102a and the wireless device 104 supports only one space time stream, and similarly the channel between the wireless access point 102b and the wireless device 104 supports only one space time stream. Such a situation may arise when the channels are essentially line of sight. However, the combined channel may support two space time streams. That is, the STA may successfully decode a first space time stream transmitted from the wireless access point 102a and a second space time stream transmitted from the wireless access point 102b. We also assume that the wireless device 104 has two RX antennas k=1, 2, although in practice it may have many more.

Each wireless access point 102a, 102b transmits respective pilot symbols s and t to the wireless device 104 using a pilot subcarrier. The signal $r_k$ received at the k-th antenna, in a pilot subcarrier, can be modelled as $$r_k = h_{k1} e^{j\theta} s + h_{k2} e^{j\varphi} t + w, \; k=1,2.$$

where $h_{k1}$ and $h_{k2}$ are the channels between the kth antenna and the wireless access points 102a, 102b respectively, θ and φ model the CFOs due to clock mismatch between the wireless device 104 and the wireless access points 102a, 102b respectively, and w represents the noise.

The wireless device 104 is able to estimate the channels $\{h_{km}\}$ from access points m=1,2 to receive antennas k=1,2 using any well-known technique. For example, if a physical layer (PHY) similar to the 802.11ax PHY is used, these estimates can be obtained by interpolating in the frequency domain any channel estimates that were obtained via earlier transmissions between the wireless device 104 and the wireless access points 102 with the help of the long training field. The pilot symbols s and t are also known, or can be determined by, the wireless device 104 using algorithms set out in the 802.11 (or equivalent) specifications.

Thus the terms $r_k$, $h_{km}$, s, and t are known (or previously estimated) at the wireless device 104. Since there are two equations (one for each receive antenna k=1,2), it is possible to use well known statistical techniques to estimate the desired CFO terms $\theta$, $\varphi$.

In this way, it is possible for the wireless device 104 to perform phase tracking (e.g., to determine the carrier frequency offset) for multiple simultaneously received data streams.

According to embodiments of the disclosure, the network informs the wireless device 104 that it should use perform multiple phase-tracking processes on signals received from a plurality of co-ordinated wireless access points. For example, in one embodiment, a network node causes the transmission, to the wireless device, of an indication that the wireless device should perform multiple separate phase-tracking processes on the signals received from the plurality of coordinated radio access network nodes in a given time resource. In this way, the wireless device is enabled to perform separate phase tracking processes for each of the multiple wireless access points, and/or for each of the multiple space time streams transmitted by the multiple wireless access points. The channel estimate for each wireless access point and/or each space time stream can then be determined using the LTF, and respective estimates of the CFO for that particular wireless access point or space time stream.

Figure 3:
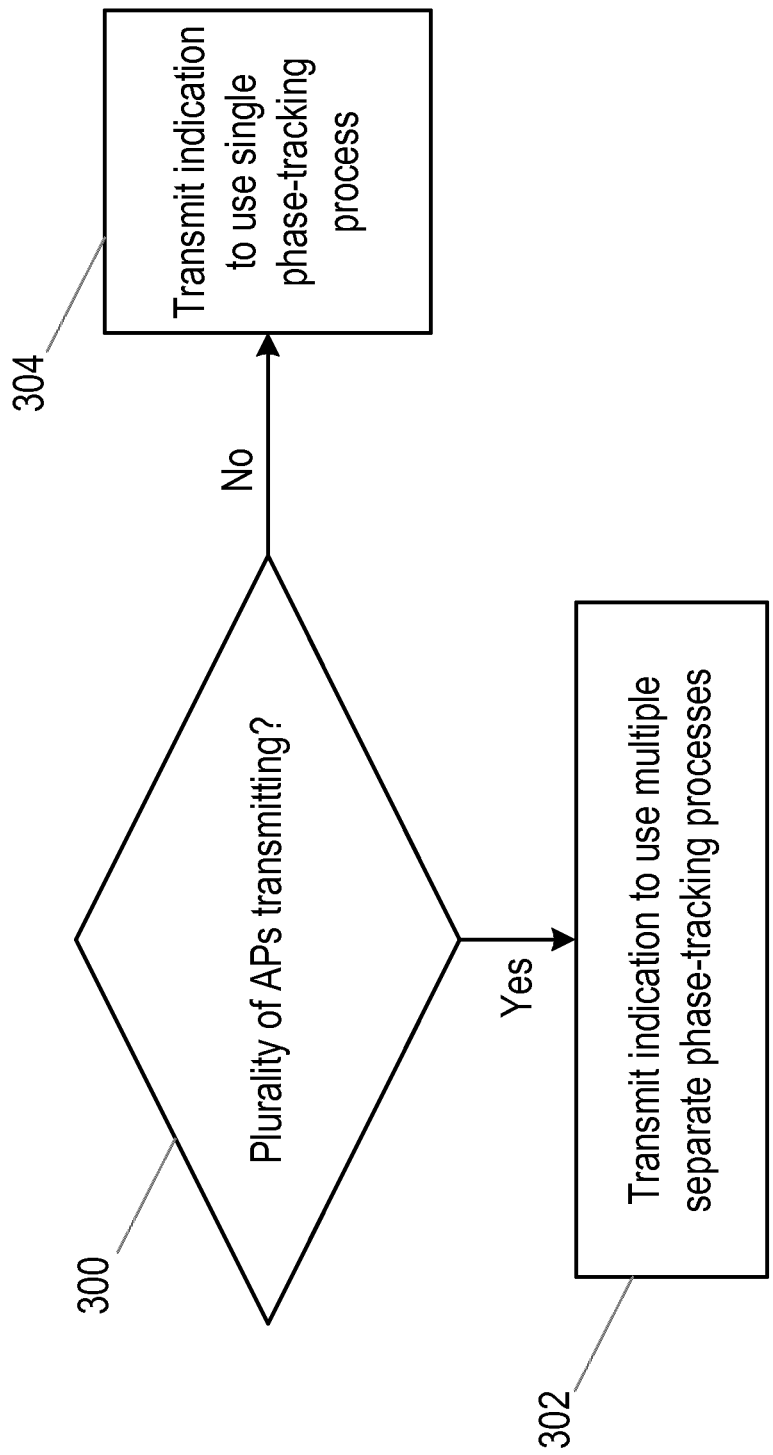
FIG. 3 is a flowchart of a method performed by a network node according to embodiments of the disclosure.

FIG. 3 is a flowchart of a method according to embodiments of the disclosure, performed by a network node. The network node may be a wireless access point, such as the master access point 102a. Alternatively, the network node may be a remote network node, such as the processing node 106.

The network node operates in the scenario of the network 100 described above with respect to FIG. 1. Thus a plurality of radio access nodes or wireless access points are co-ordinated to transmit to a wireless device simultaneously, using the same time resource (e.g., the same data frame). As noted above with respect to FIG. 2, the plurality of radio access nodes may transmit the same data to the wireless device (effectively increasing the received signal strength at the wireless device) or different data to the wireless device (increasing the potential data rate to the wireless device).

The method begins in step 300, in which the network node determines whether a plurality of access points or radio access nodes are to transmit to the wireless device simultaneously. For example, step 300 may comprise determining whether distributed downlink MIMO is to be used for transmissions to the wireless device. Such a determination may be made for each potential transmission opportunity to the wireless device, or may be made in a persistent or semi-persistent way for multiple potential transmission opportunities.

Multiple access points or distributed downlink MIMO may be used for transmissions to the wireless device based on a quality of service required by the wireless device. For example, the wireless device may utilize one or more services requiring particular high data rates, or particularly high reliability of communications. In such cases, the network provider may determine that distributed downlink MIMO can be used for transmissions to the wireless device for those services. The capabilities of the wireless device may also be used to determine whether distributed downlink MIMO can be used. Certain wireless devices may not have the functionality to perform multiple phase tracking processes (e.g., through a lack of hardware such as multiple antennas or processing power, or through a lack of adequate software).

If a plurality of access points are to transmit to the wireless device simultaneously, the method proceeds to step 302, in which the network node causes transmission to the wireless device of an indication that the wireless device should perform multiple separate phase-tracking processes on the signals received from the plurality of coordinated radio access network nodes. For example, where the network node is one of the plurality of access points (such as the master access point 102a), step 302 may comprise the network node itself transmitting the indication to the wireless device. Where the network node is a remote network node (such as the processing node 106), step 302 may comprise the network node instructing one or more (or all) of the wireless access points to transmit the indication to the wireless device.

Thus the wireless device receives multiple data streams simultaneously from the plurality of co-ordinated access points. The indication may be contained within a data packet transmitted to the wireless device in one or more of those data streams. For example, in one embodiment, the indication may be contained within a header of the data packet (such as the PHY header).

In one embodiment, the indication comprises an indication that the wireless device should perform a respective phase-tracking process on the one or more streams of data received from each access point of the plurality of coordinated access points. Here it will be noted that each access point may transmit one or multiple data streams to the wireless device. Phase tracking processes in this embodiment may be performed per access point, with the same carrier frequency offset used for each data stream received from that access point. As each data stream transmitted by a particular access point will utilize the same oscillator or clock, the carrier frequency offset will be similar for each data stream.

In an alternative embodiment, however, the indication comprises an indication that the wireless device should perform respective phase-tracking processes on each data stream received from the plurality of coordinated access points. This embodiment may be particularly relevant where each access point transmits each of the multiple data streams to the wireless device, i.e., each access point transmits the same, multiple data streams to the wireless. At any given time, one of the access points will contribute the most power for a particular data stream, and hence the CFO for that data stream will depend most on the mismatch between the clocks of the wireless device and that particular access point. In a different data stream, a different access point may contribute the most power and hence the CFO for that data stream will depend most on the mismatch between the clocks of the wireless device and that different access point. Phase tracking processes in this embodiment may be performed per data stream.

The indication may comprise a signalling field, which is set to a first value to indicate that multiple phase tracking processes should be performed by the wireless device, or to a second value to indicate that a single phase tracking process should be performed by the wireless device.

The indication may be implicit or explicit. In the former case, the indication may comprise an indication of a different property or configuration, which is interpreted by the wireless device as an instruction that it should perform multiple phase-tracking processes. For example, the indication may comprise an indication that distributed downlink MIMO is to be used for transmissions to the wireless device. The wireless device may be configured to interpret that indication so as to perform multiple phase-tracking processes as described above.

If a plurality of access points are not to transmit to the wireless device simultaneously, the method proceeds to step 304, in which the network node causes transmission to the wireless device of an indication that the wireless device should perform a single phase-tracking process on signals received in the given time resource. For example, where a single access point is to transmit to the wireless device (using MIMO transmissions or not), the network node may cause transmission to the wireless device of an indication that the wireless device should perform a single phase-tracking process. The detail set out above in step 302 with respect to the indication applies equally to step 304.

It will be noted that the embodiments above describe the network nodes as indicating that the wireless device should perform single or multiple phase tracking processes. Thus in one embodiment this indication is advisory, and the wireless device may choose to disregard the indication. Alternatively, the indication may be mandatory. For example, a telecommunications standard (such as the 802.11 specifications) may mandate that the wireless device follows the recommendation of the network node with regard to single or multiple phase tracking processes.

Figure 4:
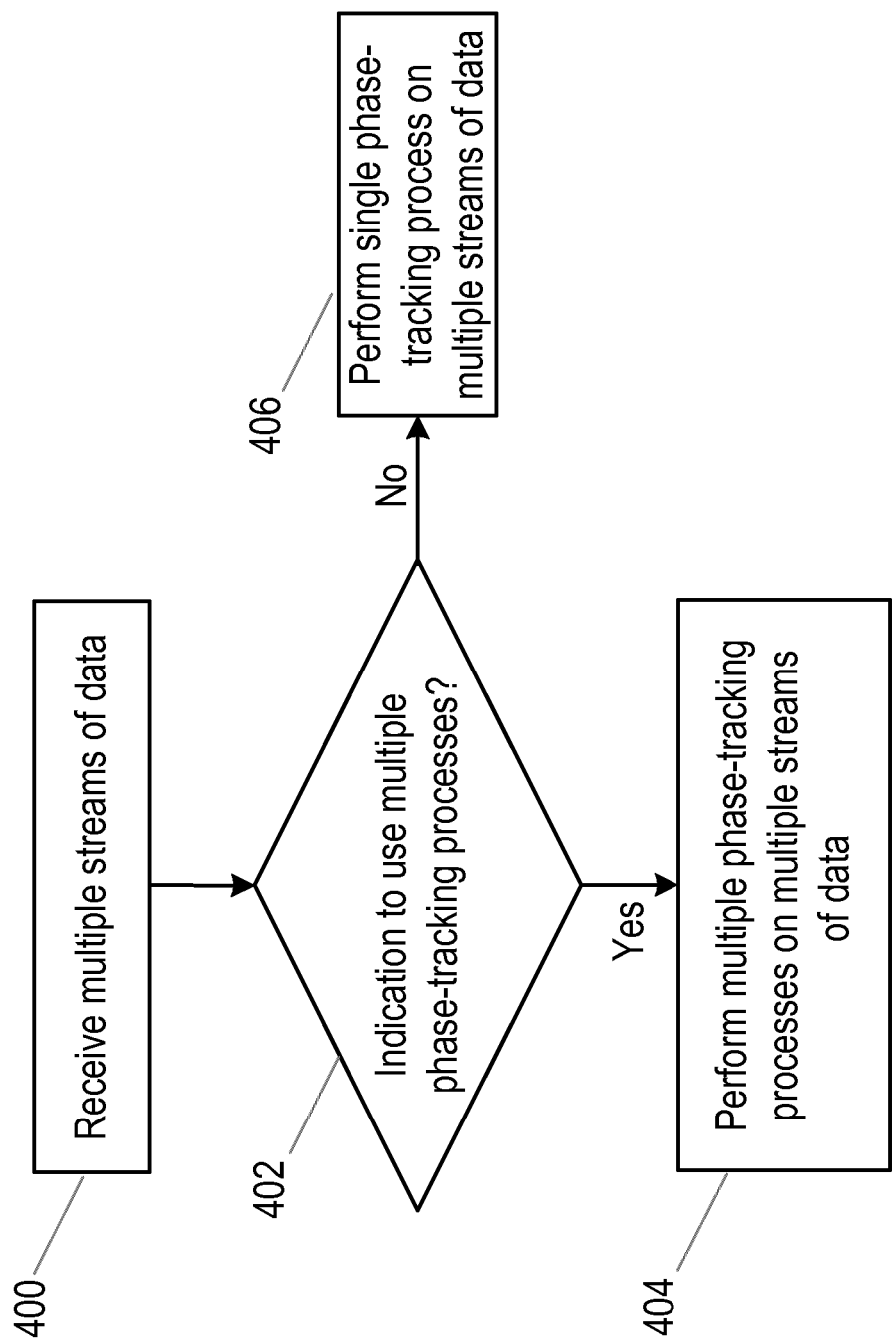
FIG. 4 is a flowchart of a method performed by a wireless device according to embodiments of the disclosure.

FIG. 4 is a flowchart of a method performed by a wireless device according to embodiments of the disclosure. The wireless device may correspond to the wireless device 104 described above with respect to FIG. 1, for example.

The wireless device operates in the scenario of the network 100 described above with respect to FIG. 1. Thus a plurality of radio access nodes or wireless access points are co-ordinated to transmit to the wireless device simultaneously, using the same time resource (e.g., the same data frame). As noted above with respect to FIG. 2, the plurality of radio access nodes may transmit the same data to the wireless device (effectively increasing the received signal strength at the wireless device) or different data to the wireless device (increasing the potential data rate to the wireless device).

The method begins in step 400, in which the wireless device receives multiple data streams simultaneously, e.g., using the same time resources (such as the same data frame). At this stage, the wireless device may not have knowledge of which access point or access points transmitted the multiple streams of data.

In step 402, the wireless device receives an indication from an access point as to whether the wireless device is to perform one or multiple phase tracking processes on the data streams received in step 400.

The indication may be contained within a data packet transmitted to the wireless device in one or more of the data streams received in step 400. For example, in one embodiment, the indication may be contained within a header of the data packet (such as the PHY header). The indication may be received in data packets transmitted from all of the data streams received in step 400.

In one embodiment, the indication comprises an indication that the wireless device should perform a respective phase-tracking process on the one or more streams of data received from each access point of the plurality of coordinated access points. Here it will be noted that each access point may transmit one or multiple data streams to the wireless device. Phase tracking processes in this embodiment may be performed per access point, with the same carrier frequency offset used for each data stream received from that access point. As each data stream transmitted by a particular access point will utilize the same oscillator or clock, the carrier frequency offset will be similar for each data stream.

In an alternative embodiment, however, the indication comprises an indication that the wireless device should perform respective phase-tracking processes on each data stream received from the plurality of coordinated access points. This embodiment may be particularly relevant where each access point transmits each of the multiple data streams to the wireless device, i.e., each access point transmits the same, multiple data streams to the wireless. At any given time, one of the access points will contribute the most power for a particular data stream, and hence the CFO for that data stream will depend most on the mismatch between the clocks of the wireless device and that particular access point. In a different data stream, a different access point may contribute the most power and hence the CFO for that data stream will depend most on the mismatch between the clocks of the wireless device and that different access point. Phase tracking processes in this embodiment may be performed per data stream.

The indication may comprise a signalling field, which is set to a first value to indicate that multiple phase tracking processes should be performed by the wireless device, or to a second value to indicate that a single phase tracking process should be performed by the wireless device.

The indication may be implicit or explicit. In the former case, the indication may comprise an indication of a different property or configuration, which is interpreted by the wireless device as an instruction that it should perform multiple phase-tracking processes. For example, the indication may comprise an indication that distributed downlink MIMO is to be used for transmissions to the wireless device. The wireless device may be configured to interpret that indication so as to perform multiple phase-tracking processes as described above.

If the indication comprises an indication that the wireless device is to perform multiple phase-tracking processes on the data streams, the method proceeds to step 404, in which the wireless device performs multiple phase tracking processes on the data streams.

It will be recalled that the signal $r_k$ received at the k-th antenna of the wireless device, in a pilot subcarrier, can be modelled as $$r_k = h_{k1}e^{j\theta}s + h_{k2}e^{j\varphi}t + w, \ k=1,2.$$

where $h_{k1}$ and $h_{k2}$ are the channels between the kth antenna and the wireless access points 102a, 102b respectively, θ and φ model the CFOs due to clock mismatch between the wireless device 104 and the wireless access points 102a, 102b respectively, and w represents the noise.

The wireless device is able to estimate the channels $\{h_{km}\}$ from access points m=1,2 to receive antennas k=1,2 using any well-known technique. For example, if a physical layer (PHY) similar to the 802.11ax PHY is used, these estimates can be obtained by interpolating in the frequency domain any channel estimates that were obtained via earlier transmissions between the wireless device and the wireless access points with the help of the long training field. The pilot symbols s and t are also known, or can be determined by, the wireless device using algorithms set out in the 802.11 (or equivalent) specifications.

Thus the terms $r_k$, $h_{km}$, s, and t are known (or previously estimated) at the wireless device, and the carrier frequency offsets can be calculated using well known statistical techniques.

If the indication comprises an indication that the wireless device is to perform a single phase-tracking process on the data streams (e.g., because a single access point transmitted the multiple streams of data received in step 400), the method proceeds to step 406, in which the wireless device performs a single phase tracking process on the data stream. Here the wireless device assumes that each of the data streams has the same value of carrier frequency offset.

Figure 5:
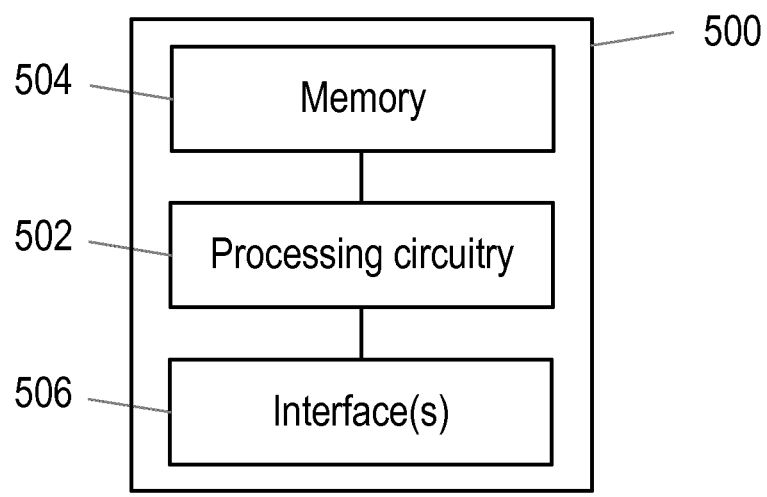
FIGS. 5 and 6 are schematic diagrams of network nodes according to embodiments of the disclosure.

FIG. 5 is a schematic diagram of a network node 500 according to embodiments of the disclosure. The network node 500 may be configured to carry out the method described above with respect to FIG. 3, for example. The network node 500 may comprise a radio access node (such as a wireless access point) or a network node coupled to such a radio access node.

The network node 500 may be configurable to form part of a communication network, which comprises a plurality of coordinated radio access network nodes for transmitting multiple streams of data to a wireless device in a given time resource. The network node 500 comprises processing circuitry 502 and a device-readable medium (such as memory) 504. The device-readable medium 504 stores instructions which, when executed by the processing circuitry 502, cause the network node 500 to: cause transmission, to the wireless device, of an indication that the wireless device should perform multiple separate phase-tracking processes on the signals received from the plurality of coordinated radio access network nodes in the given time resource.

In the illustrated embodiment, the network node 500 also comprises one or more interfaces 506, for receiving signals from wireless devices or network nodes and/or transmitting signals to wireless devices or network nodes. The interfaces 506 may use any appropriate communication technology, such as electronic signalling, optical signalling or wireless (radio) signalling.

Although FIG. 5 shows the processing circuitry 502, the memory 504 and the interface(s) 506 coupled together in series, those skilled in the art will appreciate that the components of the network node 500 may be coupled together in any suitable manner (e.g. via a bus or other internal connection).

Figure 6:
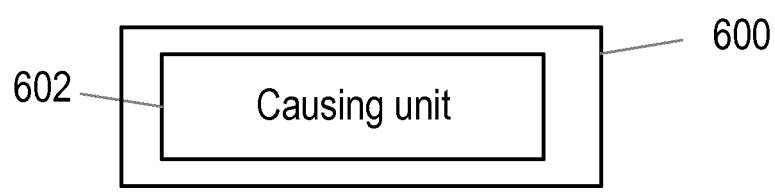

FIG. 6 is a schematic illustration of a network node 600 according to further embodiments of the disclosure. The network node 600 may be configured to perform the method of FIG. 3, for example.

The network node 600 may be configurable to form part of a communication network, which comprises a plurality of coordinated radio access network nodes for transmitting multiple streams of data to a wireless device in a given time resource. The network node 600 comprises a causing unit 602, which is configured to cause transmission, to the wireless device, of an indication that the wireless device should perform multiple separate phase-tracking processes on the signals received from the plurality of coordinated radio access network nodes in the given time resource.

The network node 600 may also comprise one or more interface modules (not illustrated), for receiving signals from wireless devices or network nodes of the network and/or transmitting signals to wireless devices or network nodes of the network. The interfaces may use any appropriate communication technology, such as electronic signalling, optical signalling or wireless (radio) signalling.

Figure 7:
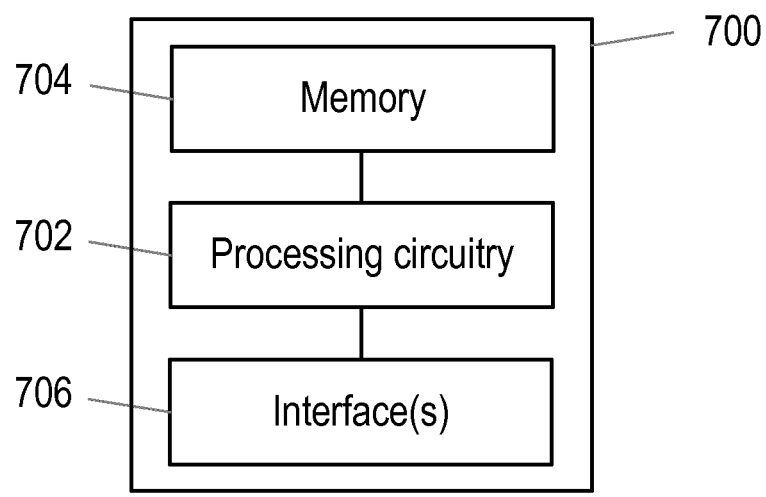
FIGS. 7 and 8 are schematic diagrams of wireless devices according to embodiments of the disclosure.

FIG. 7 is a schematic diagram of a wireless device 700 according to embodiments of the disclosure. The wireless device 700 may be configured to carry out the method described above with respect to FIG. 4, for example.

The wireless device 700 may be configured to receive data from a plurality of coordinated radio access network nodes, the plurality of coordinated radio access network nodes transmitting multiple streams of data to the wireless device in a given time resource. The wireless device 700 comprises processing circuitry 702 and a device-readable medium (such as memory) 704. The device-readable medium 704 stores instructions which, when executed by the processing circuitry 702, cause the wireless device 700 to: receive, from a network node, an indication that the wireless device should perform multiple separate phase-tracking processes on the signals received from the plurality of coordinated radio access network nodes in the given time resource.

In the illustrated embodiment, the wireless device 700 also comprises one or more interfaces 706, for receiving signals from network nodes and/or transmitting signals to network nodes. The interfaces 706 may use any appropriate communication technology, such as electronic signalling, optical signalling or wireless (radio) signalling.

Although FIG. 7 shows the processing circuitry 702, the memory 704 and the interface(s) 706 coupled together in series, those skilled in the art will appreciate that the components of the wireless device 700 may be coupled together in any suitable manner (e.g. via a bus or other internal connection).

Figure 8:
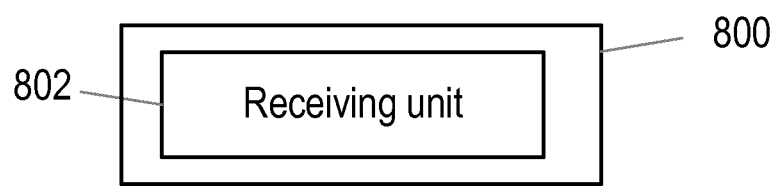

FIG. 8 is a schematic illustration of a wireless device 800 according to further embodiments of the disclosure. The wireless device 800 may be configured to perform the method of FIG. 4, for example.

The wireless device 800 may be configured to receive data from a plurality of coordinated radio access network nodes, the plurality of coordinated radio access network nodes transmitting multiple streams of data to the wireless device in a given time resource. The wireless device 800 comprises a receiving unit 802. The receiving unit 802 is configured to: receive, from a network node, an indication that the wireless device should perform multiple separate phase-tracking processes on the signals received from the plurality of coordinated radio access network nodes in the given time resource.

The wireless device 800 may also comprise one or more interface modules (not illustrated), for receiving signals from network nodes of the network and/or transmitting signals to network nodes of the network. The interfaces may use any appropriate communication technology, such as electronic signalling, optical signalling or wireless (radio) signalling.

The modules described above with respect to FIGS. 6 and 8 may comprise any combination of hardware and/or software. For example, in an embodiment, the modules are implemented entirely in hardware. As noted above, hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions. In another embodiment, the modules may be implemented entirely in software. In yet further embodiments, the modules may be implemented in combinations of hardware and software.

The present disclosure therefore provides methods, apparatus and device-readable mediums for controlling phase tracking processes in a wireless device. Specifically, an indication is transmitted to the wireless device to indicate whether the wireless device should perform one or multiple phase-tracking processes on multiple data streams received simultaneously. Where the data streams are transmitted from different access points (e.g., distributed downlink MIMO is utilized), the wireless device may be advised to utilize multiple separate phase tracking processes for the data streams. Where the data streams are transmitted from a single access point (e.g., point-to-point MIMO is utilized), the wireless device may be advised to utilize a single phase tracking process for the data streams.

Figure 9:
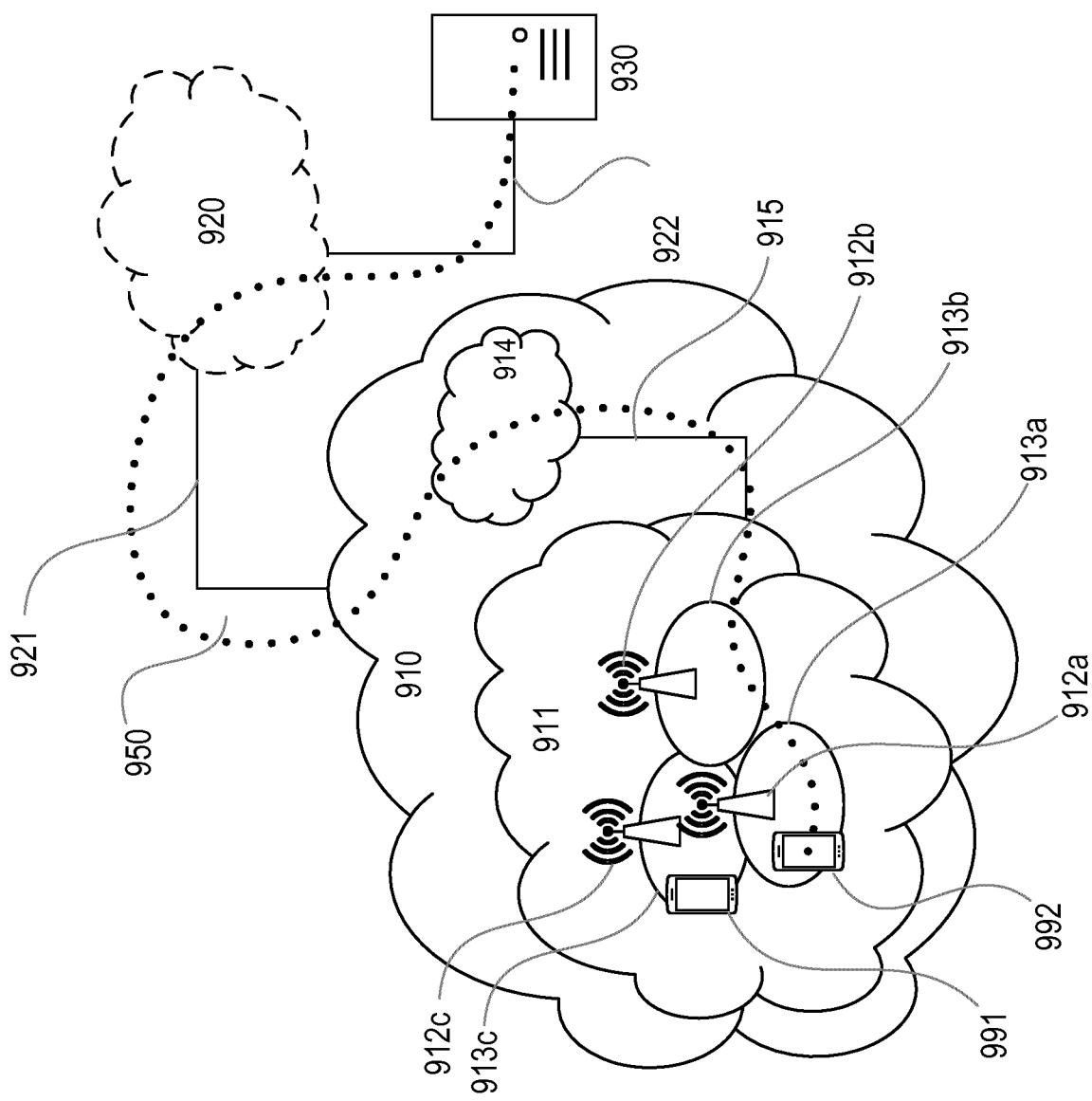
FIG. 9 shows a telecommunication network connected via an intermediate network to a host computer, according to embodiments of the disclosure.

With reference to FIG. 9, in accordance with an embodiment, a communication system includes telecommunication network 910, such as a 802.11 network or a 3GPP-type cellular network, which comprises access network 911, such as a radio access network, and may also comprise core network 914. Access network 911 comprises a plurality of base stations or access points 912a, 912b, 912c, such as NBs, eNBs, gNBs or other types of wireless access points, each defining a corresponding coverage area 913a, 913b, 913c. Each base station 912a, 912b, 912c may be connectable to core network 914 over a wired or wireless connection 915. A first UE or wireless device (or STA, etc) 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more subnetworks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or nonhuman user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
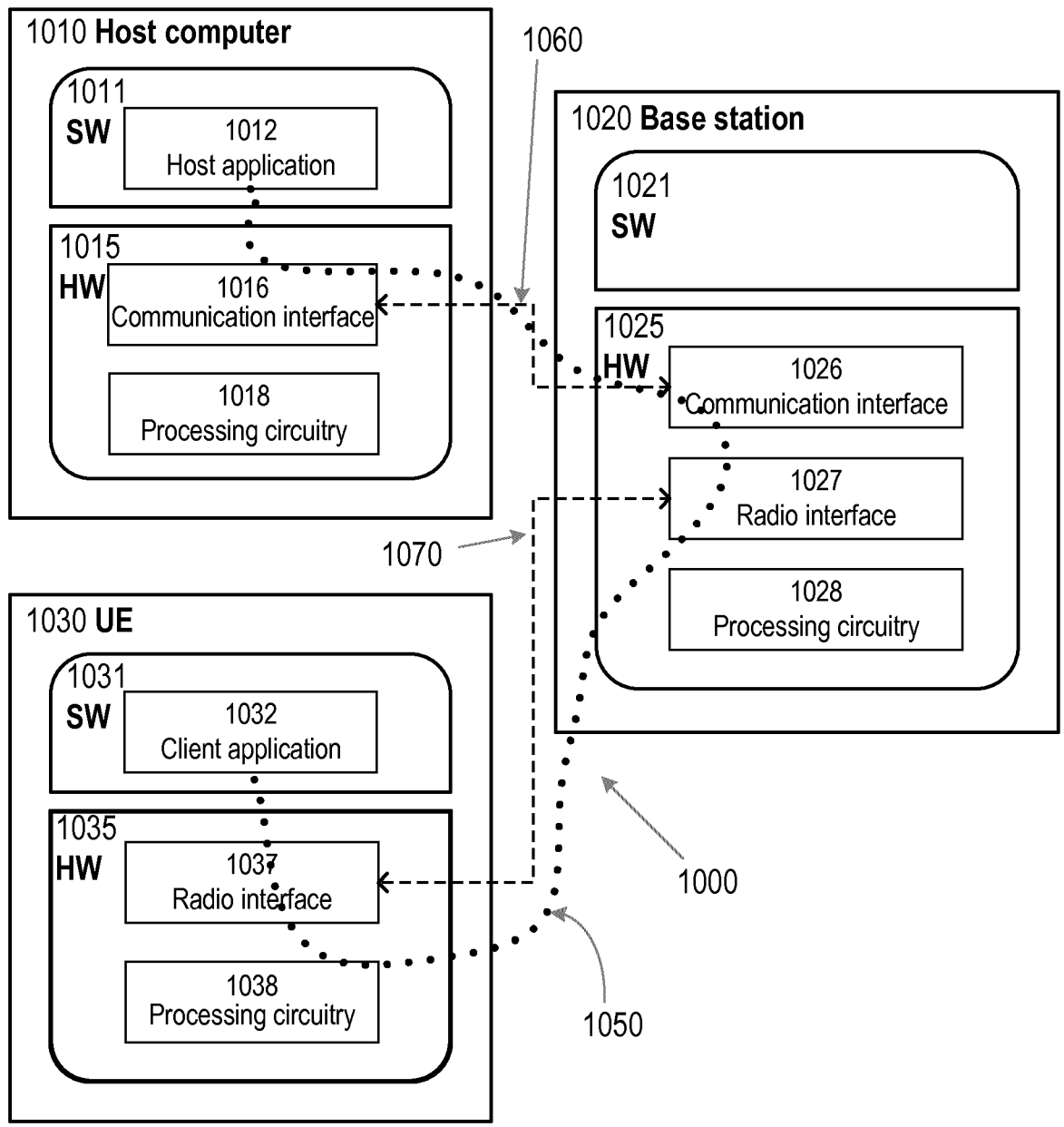
FIG. 10 shows a host computer communicating via a base station with a user equipment over a partially wireless connection, according to embodiments of the disclosure.

It is noted that host computer 1010, base station 1020 and UE 1030 illustrated in FIG. 10 may be similar or identical to host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the security and thereby provide benefits such as greater security of user data and control data without unnecessarily increasing latency for services which do not require integrity protection.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
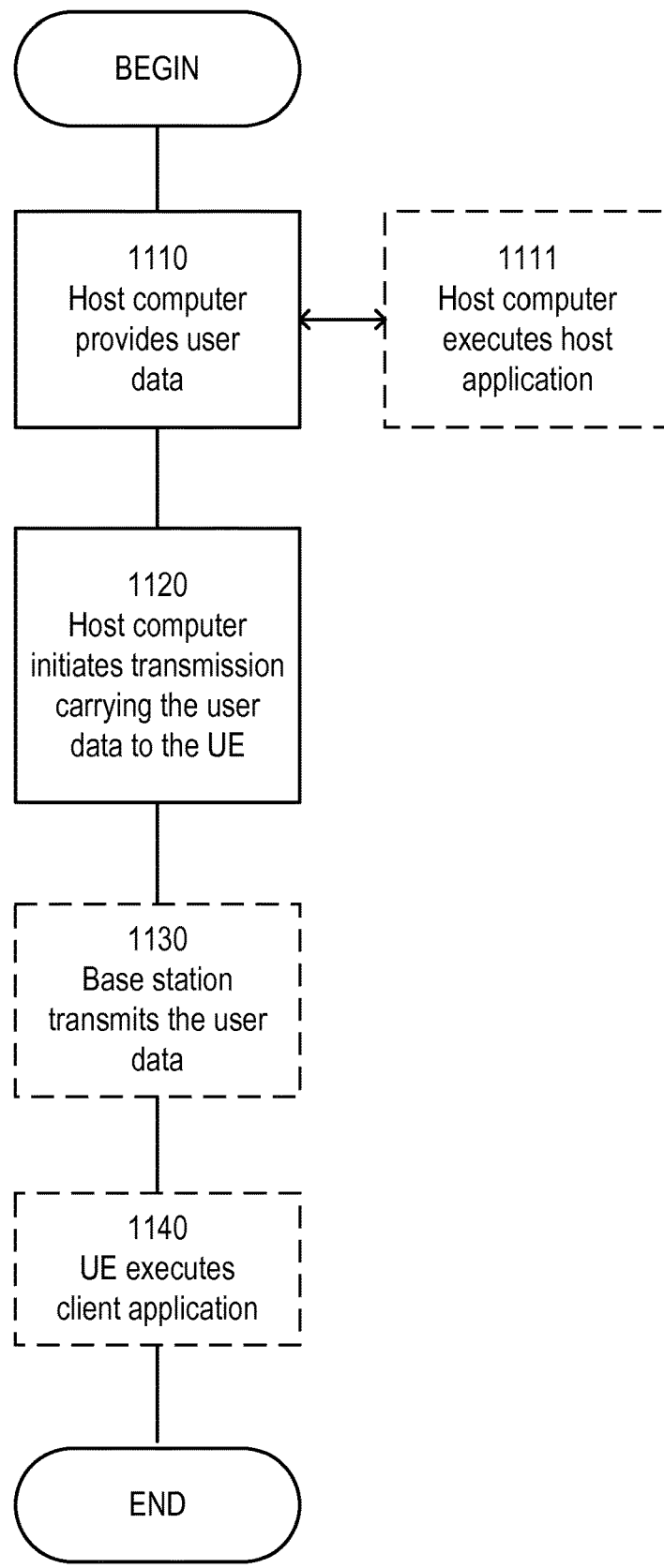
FIGS. 11 and 12 are flowcharts depicting methods in a communications system including a host computer, a base station and a user equipment, according to embodiments of the disclosure.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
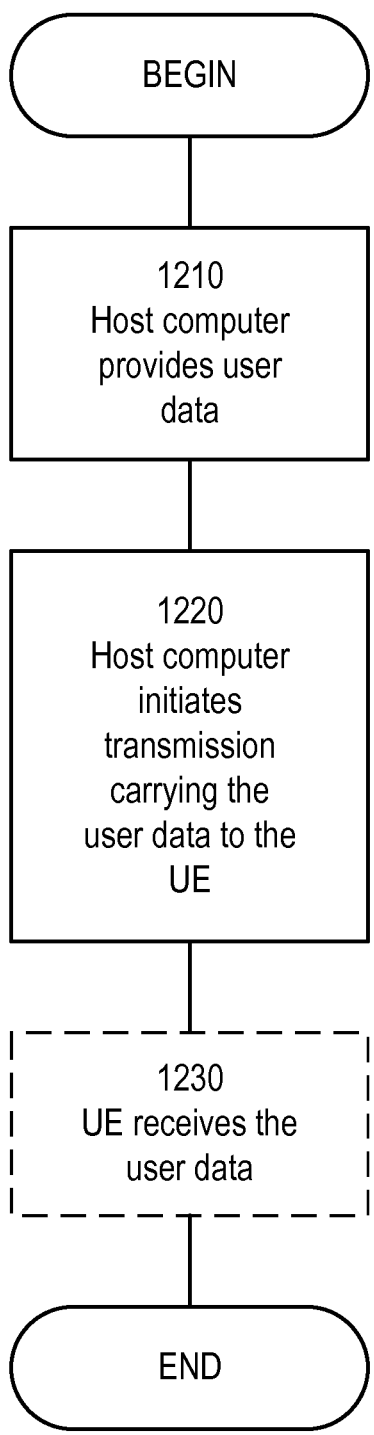

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

It should be noted that the above-mentioned embodiments illustrate rather than limit the concepts disclosed herein, embodiments without and that those skilled in the art will be able to design many alternative departing from the scope of the appended following claims. The word "comprising" does not exclude the presence of elements or steps other than those listed in a statement, "a" or "an" does not exclude a plurality, and a single processor or other unit may fulfil the functions of several units recited in the statements. Any reference signs in the claims shall not be construed so as to limit their scope.

The following numbered paragraphs set out embodiments of the disclosure:

1. A communication system including a host computer comprising:
   processing circuitry configured to provide user data; and
   a communication interface configured to forward the user data to a wireless network for transmission to a wireless device,
   wherein the wireless network comprises a network node having a radio interface and processing circuitry, the base station's processing circuitry configured to perform the method of any of claims 1 to 10 appended hereto.

2. The communication system of embodiment 1, further including the network node.

3. The communication system of embodiment 2, further including the wireless device, wherein the UE is configured to communicate with the network node.

4. The communication system of embodiment 3, wherein:
the processing circuitry of the host computer is configured to execute a host application, thereby providing the user data; and
the wireless device comprises processing circuitry configured to execute a client application associated with the host application.

5. A method implemented in a communication system including a host computer, a network node and a wireless device, the method comprising:
at the host computer, providing user data; and
at the host computer, initiating a transmission carrying the user data to the wireless device via a wireless network comprising the network node, wherein the network node performs the method according to any one of claims 1 to 10 appended hereto.

6. The method of embodiment 5, further comprising:
at the network node, transmitting the user data.

7. The method of embodiment 6, wherein the user data is provided at the host computer by executing a host application, the method further comprising:
at the wireless device, executing a client application associated with the host application.

8. A communication system including a host computer comprising:
processing circuitry configured to provide user data; and
a communication interface configured to forward user data to a wireless network for transmission to a wireless device,
wherein the wireless device comprises a radio interface and processing circuitry, the wireless device's processing circuitry configured to perform the method according to any one of claims 11 to 19 appended hereto.

9. The communication system of embodiment 8, further including the wireless device.

10. The communication system of embodiment 9, wherein the wireless network further includes a network node configured to communicate with the wireless device.

11. The communication system of embodiment 9 or 10, wherein:
the processing circuitry of the host computer is configured to execute a host application, thereby providing the user data; and
the wireless device's processing circuitry is configured to execute a client application associated with the host application.

12. A method implemented in a communication system including a host computer, a network node and a wireless device, the method comprising:
at the host computer, providing user data; and
at the host computer, initiating a transmission carrying the user data to the wireless device via a wireless network comprising the network node, wherein the wireless device performs the method according to any one of claims 11 to 19 appended hereto.

13. The method of embodiment 12, further comprising:
at the wireless device, receiving the user data from the network node.

The invention claimed is:

1. A method performed by a network node of a communication network, the communication network comprising a plurality of coordinated radio access network nodes for transmitting multiple streams of data to a wireless device in a given time resource, the method comprising:
causing transmission, to the wireless device, of an indication that the wireless device should perform multiple separate phase-tracking processes on signals received from the plurality of coordinated radio access network nodes in the given time resource, wherein the indication comprises an indication that the wireless device should perform a respective phase-tracking process on each of multiple streams of data received from the plurality of coordinated radio access network nodes.

2. The method according to claim 1, wherein the indication is contained within a data packet belonging to at least one of the multiple streams of data.

3. The method according to claim 2, wherein the indication is contained within a PHY header of the data packet.

4. The method according to claim 1, wherein the indication comprises an indication that the plurality of radio access network nodes are transmitting the multiple streams of data to the wireless device in the given time resource.

5. The method according to claim 1, wherein the given time resource comprises a data frame.

6. The method according to claim 1, wherein the communication network comprises a wireless local area network (WLAN).

7. The method according to claim 1, wherein the network node is one of the plurality of coordinated radio access network nodes.

8. The method according to claim 7, wherein the network node is a master node of the plurality of coordinated radio access network nodes.

9. A method performed by a wireless device for receiving data from a plurality of coordinated radio access network nodes, the plurality of coordinated radio access network nodes transmitting multiple streams of data to the wireless device in a given time resource, the method comprising:
receiving, from a network node, an indication that the wireless device should perform multiple separate phase-tracking processes on signals received from the plurality of coordinated radio access network nodes in the given time resource, wherein the indication comprises an indication that the wireless device should perform a respective phase-tracking process on each of multiple streams of data received from the plurality of coordinated radio access network nodes.

10. The method according to claim 9, wherein the indication is contained within a data packet belonging to at least one of the multiple streams of data.

11. The method according to claim 10, wherein the indication is contained within a PHY header of the data packet.

12. The method according to claim 9, wherein the indication comprises an indication that the plurality of radio access network nodes are transmitting the multiple streams of data to the wireless device in the given time resource.

13. The method according to claim 9, wherein the given time resource comprises a data frame.

14. The method according to claim 9, further comprising:
responsive to receipt of the indication, performing multiple separate phase-tracking processes on signals received from the plurality of coordinated radio access network nodes in the given time resource.

15. The method according to claim 14, wherein each phase-tracking process comprises estimating a carrier frequency offset based on one or more pilot symbols contained within a signal received from a radio access network node.

16. A network node for a communication network, the communication network comprising a plurality of coordinated radio access network nodes for transmitting multiple streams of data to a wireless device in a given time resource, the network node comprising processing circuitry and a non-transitory machine-readable medium storing instructions which, when executed by the processing circuitry, cause the network node to:

cause transmission, to the wireless device, of an indication that the wireless device should perform multiple separate phase-tracking processes on signals received from the plurality of coordinated radio access network nodes in the given time resource, wherein the indication comprises an indication that the wireless device should perform a respective phase-tracking process on each of multiple streams of data received from the plurality of coordinated radio access network nodes.

17. The network node according to claim 16, wherein the indication is contained within a data packet belonging to at least one of the multiple streams of data.

18. The network node according to claim 17, wherein the indication is contained within a PHY header of the data packet.

19. The network node according to claim 16, wherein the indication comprises an indication that the plurality of radio access network nodes are transmitting the multiple streams of data to the wireless device in the given time resource.

20. The network node according to claim 16, wherein the given time resource comprises a data frame.

21. A wireless device for receiving data from a plurality of coordinated radio access network nodes, the plurality of coordinated radio access network nodes transmitting multiple streams of data to the wireless device in a given time resource, the wireless device comprising processing circuitry and a non-transitory machine-readable medium storing instructions which, when executed by the processing circuitry, cause the wireless device to:

receive, from a network node, an indication that the wireless device should perform multiple separate phase-tracking processes on signals received from the plurality of coordinated radio access network nodes in the given time resource, wherein the indication comprises an indication that the wireless device should perform a respective phase-tracking process on each of multiple streams of data received from the plurality of coordinated radio access network nodes.

22. The wireless device according to claim 21, wherein the indication is contained within a data packet belonging to at least one of the multiple streams of data.

23. The wireless device according to claim 21, wherein the indication comprises an indication that the plurality of radio access network nodes are transmitting the multiple streams of data to the wireless device in the given time resource.

24. The wireless device according to claim 21, wherein the given time resource comprises a data frame.

25. The wireless device according to claim 21, wherein the wireless device is further caused to:

responsive to receipt of the indication, perform multiple separate phase-tracking processes on signals received from the plurality of coordinated radio access network nodes in the given time resource.

26. The wireless device according to claim 25, wherein each phase-tracking process comprises estimating a carrier frequency offset based on one or more pilot symbols contained within a signal received from a radio access network node.

* * * * *